(12) United States Patent
Kipka

(10) Patent No.: US 11,835,632 B2
(45) Date of Patent: Dec. 5, 2023

(54) SYSTEM AND METHOD FOR REGISTRATION OF SURVEY POINTS

(71) Applicant: Trimble Inc., Sunnyvale, CA (US)

(72) Inventor: Adrian Kipka, Hoehenkirchen (DE)

(73) Assignee: Trimble Inc., Sunnyvale, CA (US)

( * ) Notice: Subject to any disclaimer, the term of this patent is extended or adjusted under 35 U.S.C. 154(b) by 405 days.

(21) Appl. No.: 17/204,661

(22) Filed: Mar. 17, 2021

(65) Prior Publication Data

US 2021/0223403 A1 Jul. 22, 2021

Related U.S. Application Data

(62) Division of application No. 15/728,312, filed on Oct. 9, 2017, now Pat. No. 10,969,494.

(30) Foreign Application Priority Data

Oct. 10, 2016 (EP) .................................. 16193020

(51) Int. Cl.
*G01S 19/23* (2010.01)
*G06F 16/29* (2019.01)
*G01S 19/14* (2010.01)
*G01C 15/06* (2006.01)
*G01S 19/43* (2010.01)

(52) U.S. Cl.
CPC ............. *G01S 19/23* (2013.01); *G01C 15/06* (2013.01); *G01S 19/14* (2013.01); *G06F 16/29* (2019.01); *G01S 19/43* (2013.01)

(58) Field of Classification Search
CPC ........... G01S 19/23; G01S 19/14; G01S 19/43
USPC ........... 342/357.54, 357.62, 357.39, 357.23, 342/357.27
See application file for complete search history.

(56) References Cited

U.S. PATENT DOCUMENTS

| 5,929,807 | A | * | 7/1999 | Viney | G01S 5/0244 342/357.34 |
| 10,969,494 | B2 | | 4/2021 | Kipka | |
| 2009/0024325 | A1 | * | 1/2009 | Scherzinger | G01C 21/12 701/469 |

(Continued)

OTHER PUBLICATIONS

"Introducing "Lift & Tilt" Survey," retrieved on Sep. 30, 2016 from https://www.javad.com/jgnss/javad/news/pr20110302.html, 1 page.

(Continued)

*Primary Examiner* — Bo Fan
(74) *Attorney, Agent, or Firm* — KILPATRICK TOWNSEND & STOCKTON LLP

(57) ABSTRACT

The invention relates to a survey system comprising an antenna, a sensor, and a control unit. The antenna is configured for receiving one or more positioning signal, such as for example global navigation satellite system (GNSS) signals. The sensor is configured for determining whether the antenna is in a static state, and/or producing information based on which a determination as to whether the antenna is in a static state can be made. The control unit is configured for, if the antenna is determined to be in a static state, obtaining a positioning measurement based on the positioning signal(s). The invention also relates to a method for operating such a system, and to computer programs and computer program products for carrying out such a method.

20 Claims, 5 Drawing Sheets

(56) References Cited

U.S. PATENT DOCUMENTS

| | | | |
|---|---|---|---|
| 2009/0267827 A1 | 10/2009 | Allison | |
| 2010/0285587 A1* | 11/2010 | Ollerenshaw | A61F 2/04 435/378 |
| 2011/0285587 A1* | 11/2011 | Vollath | G01S 19/04 342/357.62 |
| 2012/0120415 A1 | 5/2012 | Steffensen et al. | |

OTHER PUBLICATIONS

"BD935-INS" retrieved on Oct. 6, 2016 from http://www.intech.trimble.com/oem_gnss/receiver_boards/trimble_bd935-ins, 1 page.
"Trimble BD935-INS" retrieved on Oct. 6, 2016 from http://www.intech.trimble.com/library/DS_BD935-INS_US.pdf, 2 pages.
Extended European Search Report for Application No. 16193020.1-1812, dated Apr. 24, 2017, 8 pages.
"Trimble Survey Controller™ Help", Version 12.42, Revision A, Trimble® Nov. 2008, 2 pages.
European Examination Report for Application No. 16 193 020.1-1206, dated May 22, 2019, 6 pages.
U.S. Appl. No. 15/728,312 Restriction Requirement dated Oct. 3, 2019, 6 pages.
U.S. Appl. No. 15/728,312 Non-Final Office Action dated Mar. 6, 2020, 7 pages.
U.S. Appl. No. 15/728,312 Non-Final Office Action dated Sep. 2, 2020, 24 pages.
U.S. Appl. No. 15/728,312 Final Office Action dated Jun. 23, 2020, 13 pages.
U.S. Appl. No. 15/728,312 Notice of Allowance dated Dec. 7, 2020, 8 pages.

\* cited by examiner

SYSTEM AND METHOD FOR REGISTRATION OF SURVEY POINTS

CROSS REFERENCE TO RELATED APPLICATIONS

The present application is a divisional application of U.S. application Ser. No. 15/728,312, filed Oct. 9, 2017, which claims priority to European Application No. EP 16 193 020.1, filed Oct. 10, 2016, the entire contents of which are incorporated herein by reference in their entirety for all purposes.

FIELD OF TECHNOLOGY

The invention relates generally to the field of surveying. The fields of application of the systems, methods and computer programs of the invention include, but are not limited to, navigation, map-making, land surveying, civil engineering, agriculture, disaster prevention and relief, and scientific research.

BACKGROUND

Surveying techniques typically involve a reference antenna/receiver located at a known point and a single operator who moves about with a roving antenna/receiver, or "GNSS total station". The operator stops on various unknown points to record position information in a data collector using signals transmitted by a minimum number of satellites which are above the horizon. The satellite positions are monitored closely from earth and act as reference points from which an antenna/receiver in the field is able to determine position information. By measuring the travel time of signals transmitted from a number of satellites, the receiver is able to determine corresponding distances from the satellites to the antenna phase centre, and then the position of the antenna by solving a set of simultaneous equations. The roving antenna is typically carried atop a range pole which is held by the operator to provide a clear view of the sky, although the roving antenna need not be within sight of the reference antenna. A vector or baseline is determined from a reference site to the rover. The need for a reference site is eliminated when a regional or global network of reference sites has been incorporated into the system, which allows the absolute position of the rover to be determined in a global reference frame such as the International Terrestrial Reference System (ITRF).

Surveyors may have to measure dozens or possibly hundreds of points during a typical work period. For each point, the survey pole, also known as "range pole", "rover pole", or "roving pole", must be oriented vertically over the ground point for a short time, and the survey point (or "stake-out" point when a physical mark is to be established) is registered by pressing a button on a handheld controller, which is typically connected to a global navigation satellite system (GNSS) receiver to store the point, i.e. to store positioning information associated with the point. This is a tedious procedure. In particular, in accordance with best survey practice, the survey pole has to be set vertically using a physical or electronical bubble and the operator then has to press a button on the survey controller which usually is mounted on the survey pole. At the time when the "save" or "store" button is pressed on the handheld device, the survey pole may have moved from the vertical (historically known as "pole wobble") due to, for example, carelessness or the effect of wind force. This is a potential source of positioning errors.

The receiver of type TRIUMPH-VS from JAVAD GNSS Inc., San Jose, Calif., USA, incorporates a so-called "Lift & Tilt" mode. In that mode, orienting the survey pole vertically or near vertically (better than 5 degrees) over the ground leads to the automatic registration of the current survey point. Thereafter, tilting the pole leads to closing the file, thus recording positioning information associated with the point in memory. The "Lift & Tilt" mode is described on the following web page (consulted on Sep. 30, 2016): https://www.javad.com/jgnss/javad/news/pr20110302.html.

There is a constant need for improving surveying devices and methods for operating those, so as notably to increase their usability, to increase the productivity of the survey and positioning systems, and to reduce unintentional errors introduced during field procedures.

SUMMARY

The present invention aims at addressing, at least partially, the above-mentioned need. The invention includes systems, methods, computer programs, and computer readable mediums as defined in the independent claims. Particular embodiments are defined in the dependent claims.

In one embodiment, a survey system comprises: an antenna configured to receive at least one positioning signal; a sensor configured to determining whether the antenna is in a static state, and/or producing information based on which a determination as to whether the antenna is in a static state can be made; and a control unit configured for, if the antenna is determined to be in a static state, obtaining a positioning measurement (also known as "ranging measurement") based on the at least one positioning signal.

In contrast to prior art systems, the above-described survey system does not rely on the verticality of a survey pole (or similar device) to register a survey point, but rather relies on detecting whether the antenna (and the survey pole or similar device carrying the antenna) is static (or near static), which leads to a more flexible surveying process since it is sometimes difficult if not impossible to set up the survey pole (or similar device) vertically above a ground point as objects, obstacles, or the configuration of the terrain may prevent the operator from doing so.

The invention also relates to a method for operating a survey system comprising an antenna configured to receive at least one positioning signal. A sensor performs at least one of the following operations: determining whether the antenna is in a static state, and producing information based on which a determination as to whether the antenna is in a static state can be made. If the antenna is determined to be in a static state, the control unit obtains a positioning measurement based on the at least one positioning signal.

The invention also relates, in some embodiments, to computer programs, computer program products, computer readable mediums, and storage mediums for storing such computer programs, comprising computer-executable instructions for carrying out, when executed on a computer such as one embedded in a survey apparatus or connected thereto, the above-mentioned method.

BRIEF DESCRIPTION OF THE DRAWINGS

Embodiments of the present invention shall now be described, in conjunction with the appended drawings in which.

DETAILED DESCRIPTION

The present invention shall now be described in conjunction with specific embodiments. The specific embodiments serve to provide the skilled person with a better understanding, but are not intended to in any way restrict the scope of the invention, which is defined by appended claims. In particular, the embodiments described independently throughout the description can be combined to form further embodiments to the extent that they are not mutually exclusive.

As used herein, the terms "survey" and "surveying" include, but are not limited to, topographic, geodetic, detail, stake-out, site checking, boundary and local control work. Embodiments of the present invention are potentially useful in all such aspects of surveying, and in any other work which involves an operator who takes measurements with a survey pole or similar device. Embodiments of the invention may be useful with any remote positioning system that is suitable for survey work, whether satellite-based (e.g., global positioning system (GPS), the global orbiting navigation system (GLONASS), Galileo, BeiDou (BDS), etc.) or land-based (e.g., a radio navigation system that simulates a configuration of satellites).

As used herein, the term "operator" includes, but is not limited to, a human, or a robot programmed to perform survey functions as described herein (e.g. carrying a survey device(s) and stopping periodically to perform the survey).

Figure 1:
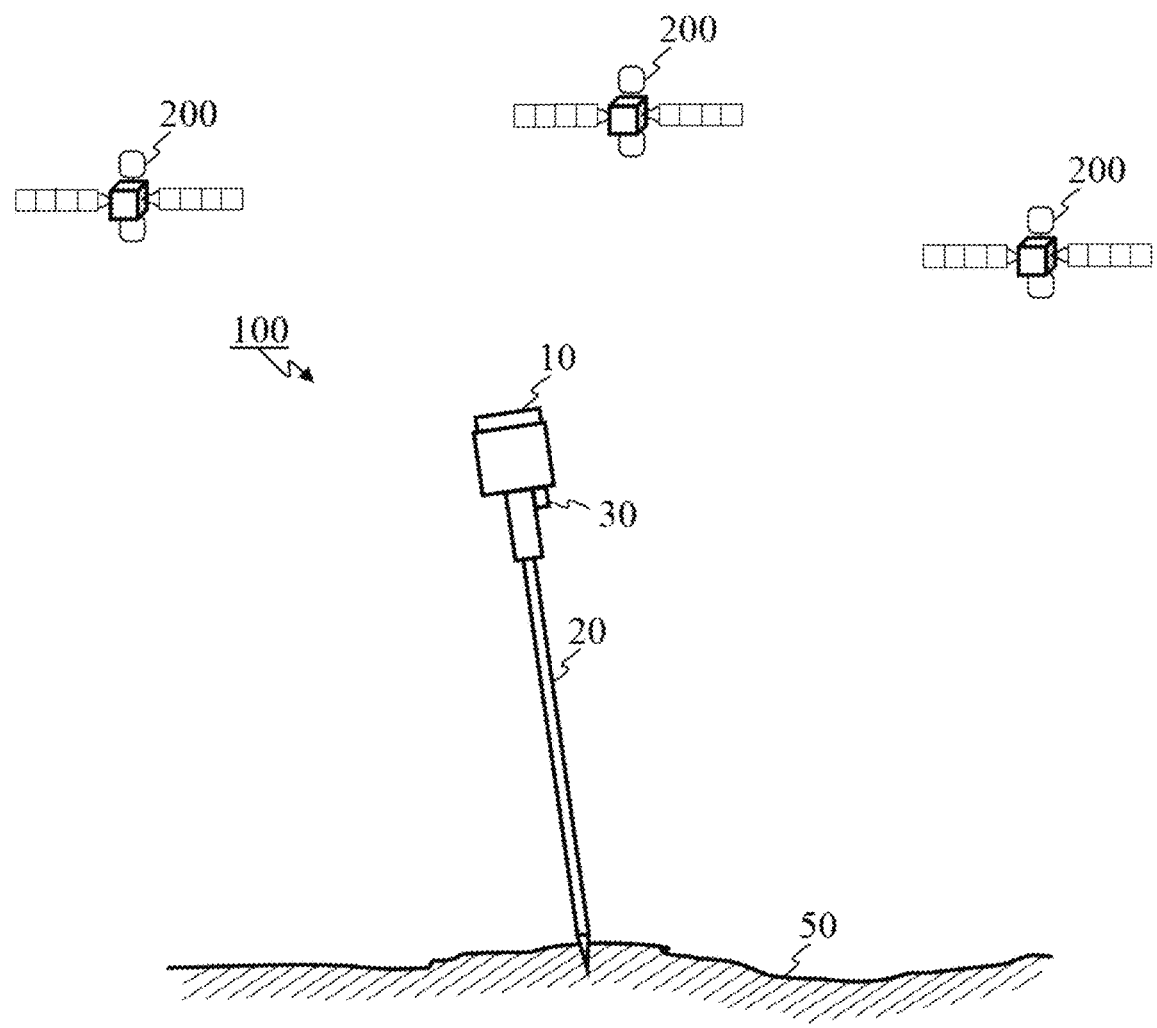
FIG. 1 schematically illustrates a survey system in one embodiment of the invention, and an exemplary environment wherein such a survey system may be used.
Figures 2A, 2B:
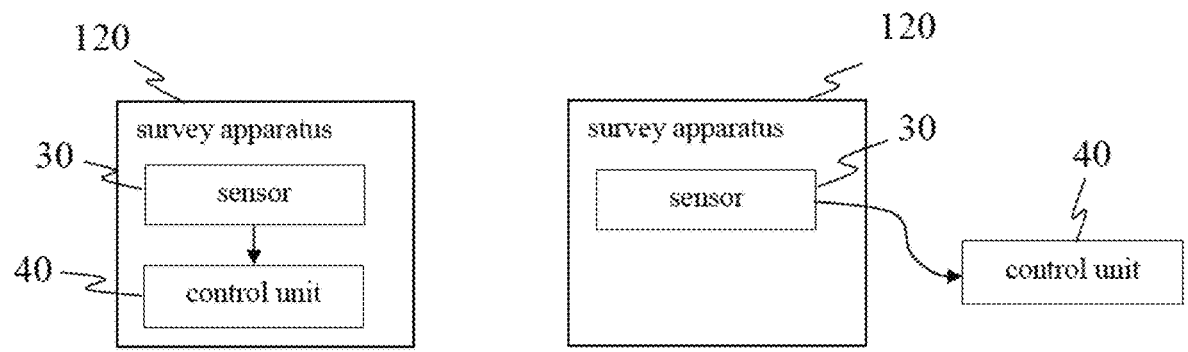
FIG. 2a schematically illustrates a survey system comprising a survey apparatus having a sensor and a control unit, in one embodiment of the invention.
FIG. 2b schematically illustrates a survey system comprising, on the one hand, a survey apparatus having a sensor, and, on the other hand, a control unit arranged outside the survey apparatus, in one embodiment of the invention.

FIG. 1 schematically illustrates a survey system 100 in one embodiment of the invention, comprising for example a GNSS total station, which may be used to perform survey work. Survey system 100 comprises an antenna 10, a sensor 30, and a control unit 40 (not illustrated in FIG. 1). Control unit 40 may be arranged in a survey apparatus 120 comprising antenna 10 and sensor 30 as well, as schematically illustrated in FIG. 2a, or may be arranged outside survey apparatus 120 and connected to sensor 30 using wired or wireless means, as schematically illustrated in FIG. 2b, or connected to survey apparatus 120 using wired or wireless means and thus indirectly to sensor 30. Survey system 100 comprises a survey pole 20, which may for example be a one-legged portable stand (i.e., a monopod) comprising a rod supporting the antenna 10. Survey pole 20 is positioned over the ground 50. Other supporting structures than a pole may be used, such as for example a bipod or tripod.

Antenna 10 is configured to receive one or more positioning signals, such as for example a GPS signal (such as the L1, L2 or L5 signal), a GLONASS signal, a Galileo signal, a BeiDou (BDS) signal, a QZSS signal, an IRNSS signal, or any combination thereof. In other words, antenna 10 is configured to receive signals at the frequencies broadcasted by satellites 200. If a given navigation satellite system (NSS) satellite 200 emits more than one NSS signal, antenna 10 may receive more than one NSS signal from said NSS satellite 200. Furthermore, antenna 10 may receive NSS signals from a single NSS or, alternatively, from a plurality of different NSS. Survey system 100 may as well include multiple antennas 10 on a single survey pole 20. In one embodiment, antenna 10 is a NSS antenna, i.e. a GNSS and/or a regional NSS (RNSS) antenna.

Sensor 30 is configured to determine whether the survey apparatus comprising antenna 10 is in a static state and, if so, to output a signal, here referred to as "static state signal", indicating that antenna 10 (and the survey apparatus carrying it) is in a static state. If survey system 100 comprises a survey pole 20 attached to antenna 10 (as illustrated), sensor 30 is therefore configured to determine whether the survey apparatus comprising antenna 10 and survey pole 20 is in a static state. In one embodiment, sensor 30 is configured to determine whether the survey apparatus comprising antenna 10 and survey pole 20 is in a static state no matter whether survey pole 20 nears a vertical position or not.

The expression "in a static state" means here either static or near static, wherein "near static" means static within a predetermined threshold tolerance level.

Sensor 30 may be, may be part of, or may comprise an inertial navigation system (INS), comprising for example one or more accelerometers (e.g., a micro-electro-mechanical systems (MEMS) accelerometer), and/or one or more gyroscopes, for the purpose of determining that the survey apparatus comprising antenna 10 is in a static state. Additionally, or alternatively, sensor 30 may comprise one or more cameras, one or more video cameras, or a combination of any of those, for the purpose of determining that the survey apparatus comprising antenna 10 is in a static state. The degree of change in images recorded over time by a camera (or cameras) or video camera (or video cameras) may be usable to determine whether the survey apparatus comprising antenna 10 is static or, instead, mobile. Such camera(s) or video camera(s) is typically directed towards the ground. In one embodiment, sensor 30 is an inertial sensor or inertial measurement unit (IMU). Sensor 30 may for example be rigidly attached to an outside of, or rigidly embedded inside, survey pole 20 or antenna 10.

Control unit 40 is configured to obtain (i.e., acquire or receive) the above-referred static state signal from sensor 30 and, upon obtaining said static state signal, to obtain a positioning measurement based on the positioning signal(s). Positioning measurements may for example be derived from pseudo-random number (PRN) code measurements and/or carrier phase measurements using methods well known in the art. Control unit 40 may be configured exclusively to obtain the static state signal from sensor 30 and, upon obtaining said static state signal, to obtain a positioning measurement based on the positioning signal(s), or, alternatively, control unit 40 may be configured to perform other operations as well, no matter the nature of these operations, whether those are typically associated for example with a survey controller, a GNSS receiver, or an INS. Control unit 40 may for example be attached to an outside of, or embedded inside, survey pole 20 or antenna 10 (as schematically illustrated by FIG. 2a). Control unit 40 may also be arranged in a handheld controller (or the like) that is not, or need not be, attached to survey pole 20 or antenna 10 (as schematically illustrated by FIG. 2b).

As already briefly discussed above, in contrast to prior art systems, survey system 100 does not rely on the verticality of survey pole 20 to register survey points, but rather relies on detecting the static state of survey pole 20. For operators, this increases the flexibility of the surveying process, since it is sometimes difficult or even impossible to orient a survey pole vertically above a ground point because objects, obstacles, or the configuration of the terrain may prevent the operator from doing so.

The survey apparatus comprising antenna 10 and survey pole 20 may also comprise various other elements, such as any one of, or any combination of: a) one or more housings for containing, covering and/or protecting antenna 10, sensor 30 and optionally control unit 40; b) supporting elements integrally formed within the housing(s), or attached thereto, to maintain antenna 10, sensor 30 and optionally control unit 40 in place relative to the housing(s); c) one or more central processing units (CPU) or processors (e.g., for processing raw data from sensor 30); d) one or more accurate clocks (such as crystal oscillators or atomic disciplined crystal oscillators); e) one or more data storage units (RAM, ROM, flash memory, or the like); f) one or more removable data storage unit (e.g., SD Card and/or USB slots); g) wired or wireless communication means (e.g., Ethernet, Wi-Fi, or Bluetooth); h) one or more input and/or output user interfaces for providing information to and receiving information from an operator (e.g., keyboard(s), keypad(s), display screen(s), touch screen(s), push-button(s), control knob(s), LED indicator light(s), speaker(s), microphone(s), etc.); i) one or more batteries or photovoltaic (solar) cells for powering various electronic parts of the survey apparatus comprising antenna 10, sensor 30, and optionally control unit 40; j) one or more cables, wired or wireless (for example Wi-Fi or Bluetooth) connections for connecting the survey apparatus to other pieces of equipment or peripherals; k) one or more handles or shoulder straps; etc. The survey apparatus comprising antenna 10, sensor 30, and optionally control unit 40, may be connected or connectable, wirelessly or not, to other pieces of equipment, such as for example a handheld controller, a GNSS receiver (hosting e.g. a real-time kinematic (RTK) engine), or any other portable device.

Figure 3:
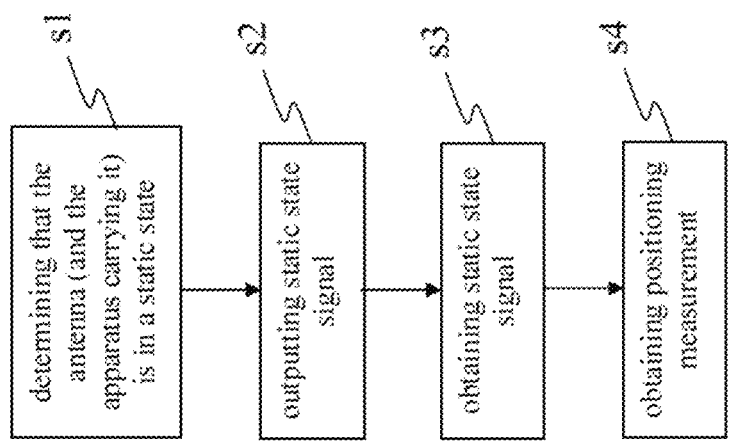
FIG. 3 is a flowchart of a method of operation of a survey system in one embodiment of the invention.

FIG. 3 is a flowchart of a method of operation of a survey system 100 in one embodiment of the invention. The method comprises the following steps:

Sensor 30 determines s1 whether antenna 10 (and the apparatus carrying it, hereinafter referred to in combination with the antenna as the "antenna-carrying apparatus") is in a static state. If so, sensor 30 outputs s2 a static state signal indicating that the antenna-carrying apparatus is in a static state. For example, the determination that the antenna-carrying apparatus is in a static state may be based on a standard deviation computation of accelerometer data over a period of time (e.g., 250 ms). The accelerometer data may for example be provided at a frequency of 50, 100, 150, or 200 Hz. For example, 100 Hz data may be provided using the inertial sensor technology available in the Trimble BD935-INS receiver module, which is commercially available from Trimble Navigation Limited, based in Sunnyvale, Calif., USA, and described on the following web page: http://www.intech.trimble.com/oem_gnss/receiver boards/trimble_bd935-ins (consulted on Oct. 6, 2016). The datasheet of the Trimble BD935-INS product is available from: http://www.intech.trimble.com/library/DS_BD935-INS_US.pdf (consulted on Oct. 6, 2016).

Control unit 40 obtains s3 the static state signal from sensor 30, and, upon obtaining said static state signal, control unit 40 obtains s4 a positioning measurement based on the positioning signal(s) received by antenna 10.

In one embodiment, the data from sensor 30, such as for example gyroscope data, is also used to retrieve the current attitude of survey pole 20. This enables the measurement of a point even when survey pole 20 is not vertically oriented. In other words, if survey pole 20 is not set up vertically above the ground point, a tilted measurement may be made of the antenna-carrying apparatus position, which can then be corrected (or translated) to the point of the survey pole 20 thanks to the knowledge of the attitude (roll, pitch and yaw) and the length of survey pole 20.

It has been mentioned above that, in one embodiment, sensor 30 is configured to determine whether the survey apparatus comprising antenna 10 and survey pole 20 is in a static state no matter whether survey pole 20 nears a vertical position or not. That is, a determination as to whether antenna 10 is in a static state may be independent from whether survey pole 20 (or the like) nears a vertical position. In one embodiment, survey system 100 is nonetheless limited to operate only if survey pole 20 (or the like) is not tilted more than a threshold angle. In one embodiment, the threshold angle is a value comprised between 15 and 90 degrees, preferably between 25 and 90 degrees, such as for example 25, 30, 35, 40, 45, 50, 60, 75, or 90 degrees from the vertical position of survey pole 20 (or the like). This limitation in the operation of survey system 100 may for example be implemented by any one of, or by a combination of, the following means:

a) sensor 30 is configured for, only if survey pole 20 (or the like) is not tilted more than the threshold angle, determining whether antenna 10 is in a static state;

b) sensor 30 is configured for, only if survey pole 20 (or the like) is not tilted more than the threshold angle, outputting the static state signal (provided that antenna 10 is determined to be in a static state);

c) sensor 30 is configured for, only if survey pole 20 (or the like) is not tilted more than the threshold angle, producing information based on which a determination as to whether antenna 10 is in a static state can be made;

d) control unit 40 is configured for, only if survey pole 20 (or the like) is not tilted more than the threshold angle, and if antenna 10 is determined to be in a static state, obtaining a positioning measurement based on the positioning signal(s); and e) control unit 40 is configured for, only if survey pole 20 (or the like) is not tilted more than the threshold angle, storing the positioning measurement in a storage unit.

Figure 4:
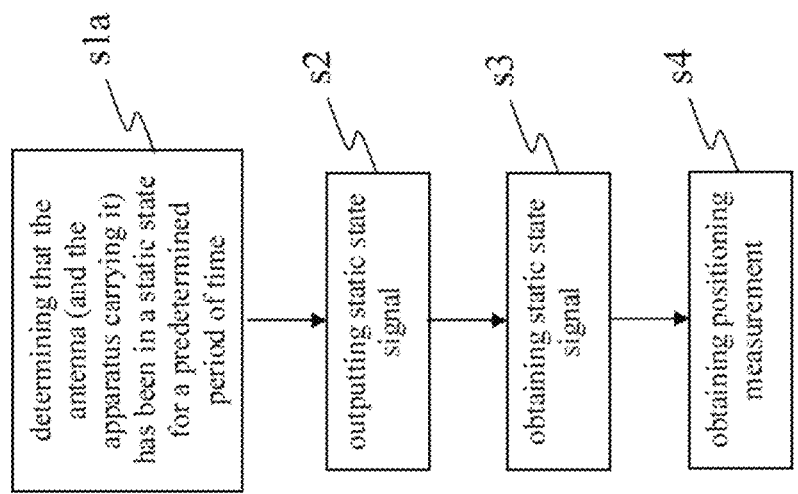
FIG. 4 is another flowchart of a method of operation of a survey system in one embodiment of the invention, wherein the antenna is determined to be in a static state when it has been static or near static for a predetermined period of time.

FIG. 4 is a flowchart of a method of operation of a survey system 100 in one embodiment of the invention, wherein the antenna-carrying apparatus is determined s1a to be static or near-static when, and preferably only when, it has been static or near-static for a predetermined period of time. In other words, sensor 30 outputs s2 the static state signal only after determining s1a that the antenna-carrying apparatus has been static or near-static for a predefined period of time. The predefined period of time may for example be a value comprised between 1 and 20 seconds, in particular a value comprised between 1 and 10 seconds, and more in particular a value comprised between 2 and 5 seconds. In one embodiment, the predefined period of time is 3 seconds.

Figure 5:
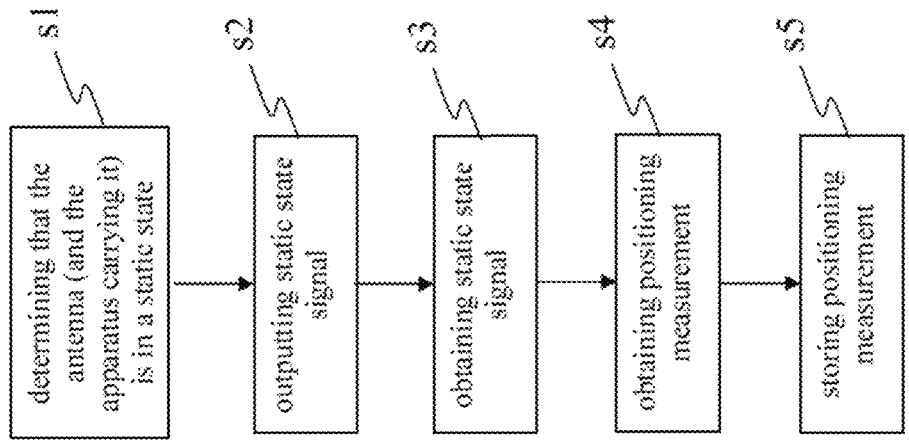
FIG. 5 is a flowchart of a method of operation of a survey system in one embodiment of the invention, wherein, after a positioning measurement has been obtained, the positioning measurement is stored in a storage unit.

FIG. 5 is a flowchart of a method of operation of a survey system 100 in one embodiment of the invention, wherein, after a positioning measurement is obtained s4, the positioning measurement is stored s5 (i.e., coordinates of the point, or any information useful to determine the position of the point, are stored). In other words, after control unit 40 obtains s3 the static state signal from sensor 30 and thereafter obtains s4 the positioning measurement based on the positioning signal(s) received by antenna 10, control unit 40 stores s5 the positioning measurement in a storage unit.

Figure 6:
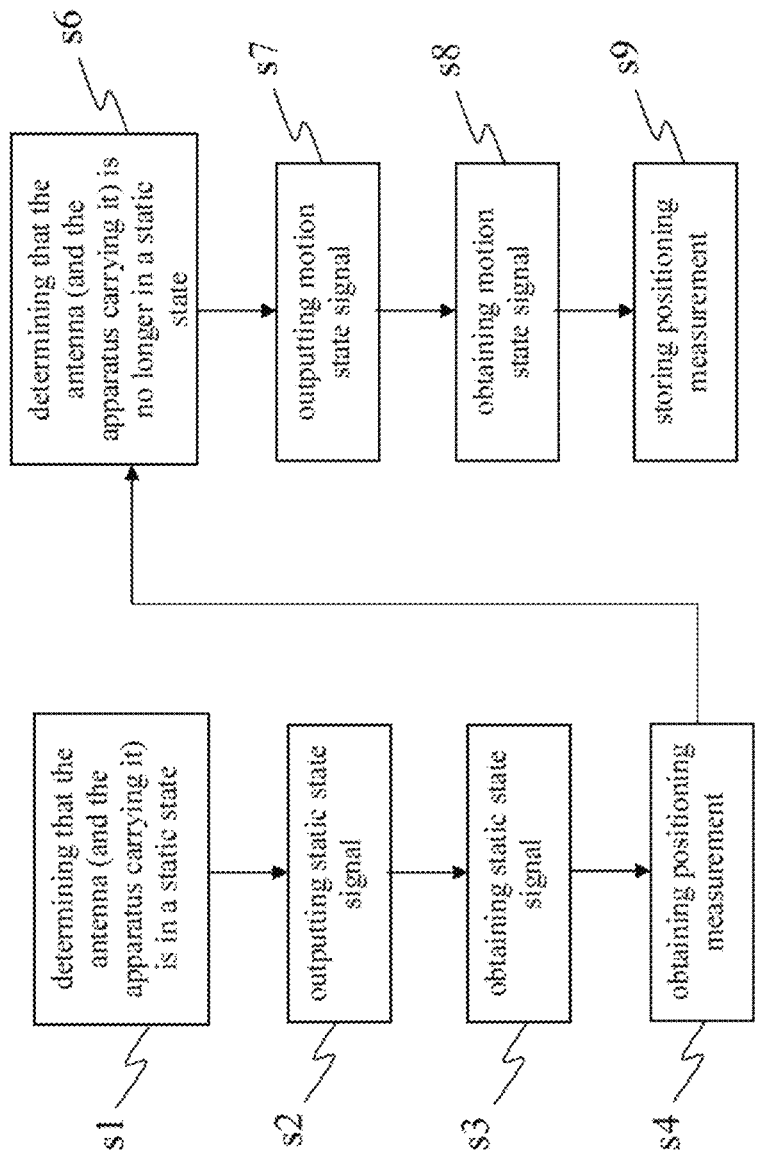
FIG. 6 is a flowchart of a method of operation of a survey system in one embodiment of the invention, wherein, after a positioning measurement has been obtained and the antenna is determined no longer to be static, the positioning measurement is stored in a storage unit.

FIG. 6 is a flowchart of a method of operation of a survey system 100 in one embodiment of the invention, wherein, after a positioning measurement is obtained s4 and antenna 10 is determined s6 no longer to be static, the positioning measurement is stored s9. More in particular, sensor 30 determines s6 that the antenna-carrying apparatus is no longer static, and sensor 30 then outputs s7 a signal, referred to as "motion state signal", which indicates that the antenna-carrying apparatus is no longer static. Control unit 40 obtains s8 the motion state signal from sensor 30 and then stores s9 the positioning measurement in a storage unit. This embodiment (i.e., a motion-controlled point registration process, performed after detection of a movement of the survey pole) contributes to an automated registration of survey points, in that the operator does not necessarily have to press a button on a handheld controller to register a point—and optionally removing the need for any handheld controller—, thus increasing the productivity for operators and allowing the registration of more points in a given period of time with or without a handheld controller.

In one embodiment, once the positioning measurement has been stored s9 in a storage unit, a feedback, such as for example a visual or audio feedback, is issued, to inform the operator that the point has been registered and that the survey can be carried on with the next point, if any.

Figure 7:
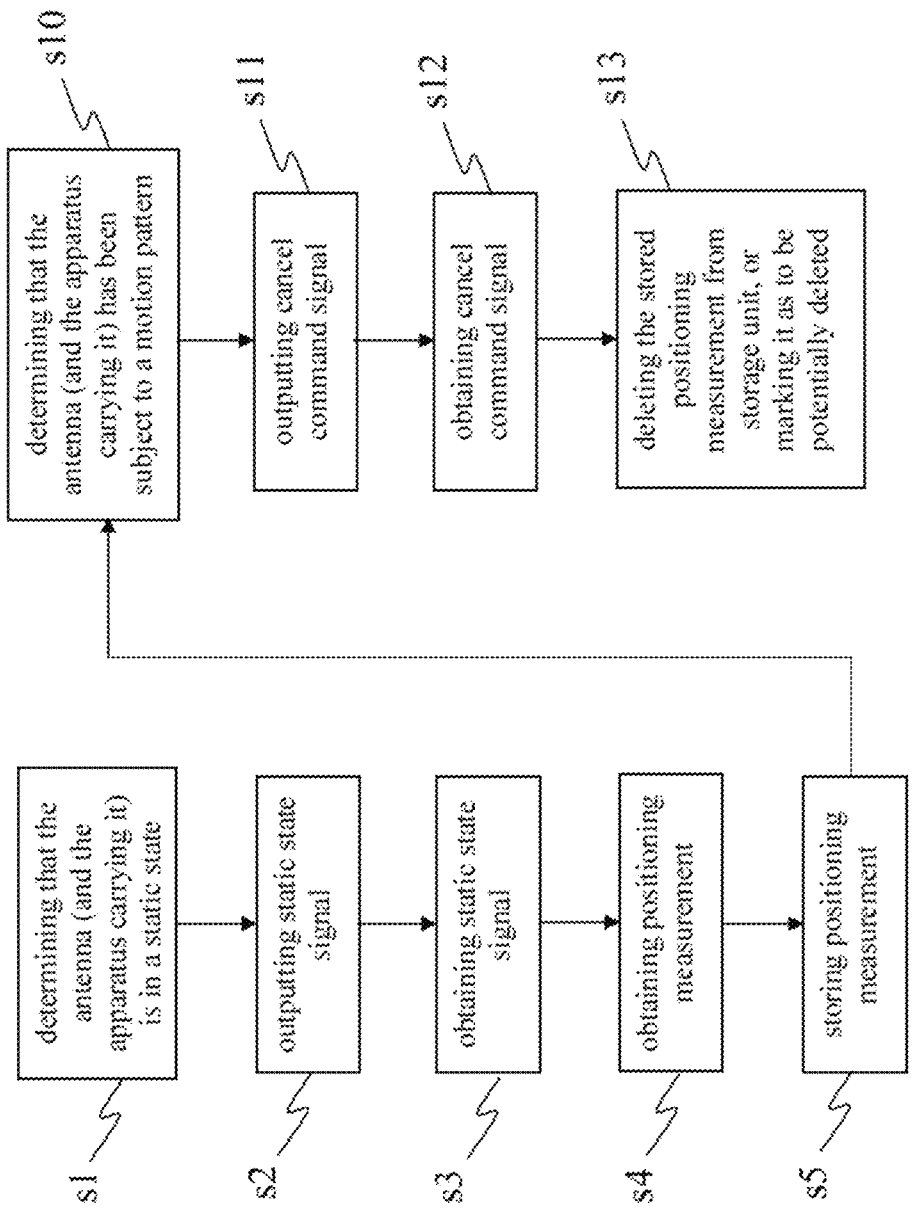
FIGS. 7 and 8 are flowcharts of methods of operation of a survey system in two embodiments of the invention, wherein subjecting the antenna to a motion pattern leads to the issuance of a cancel command signal.
Figure 8:
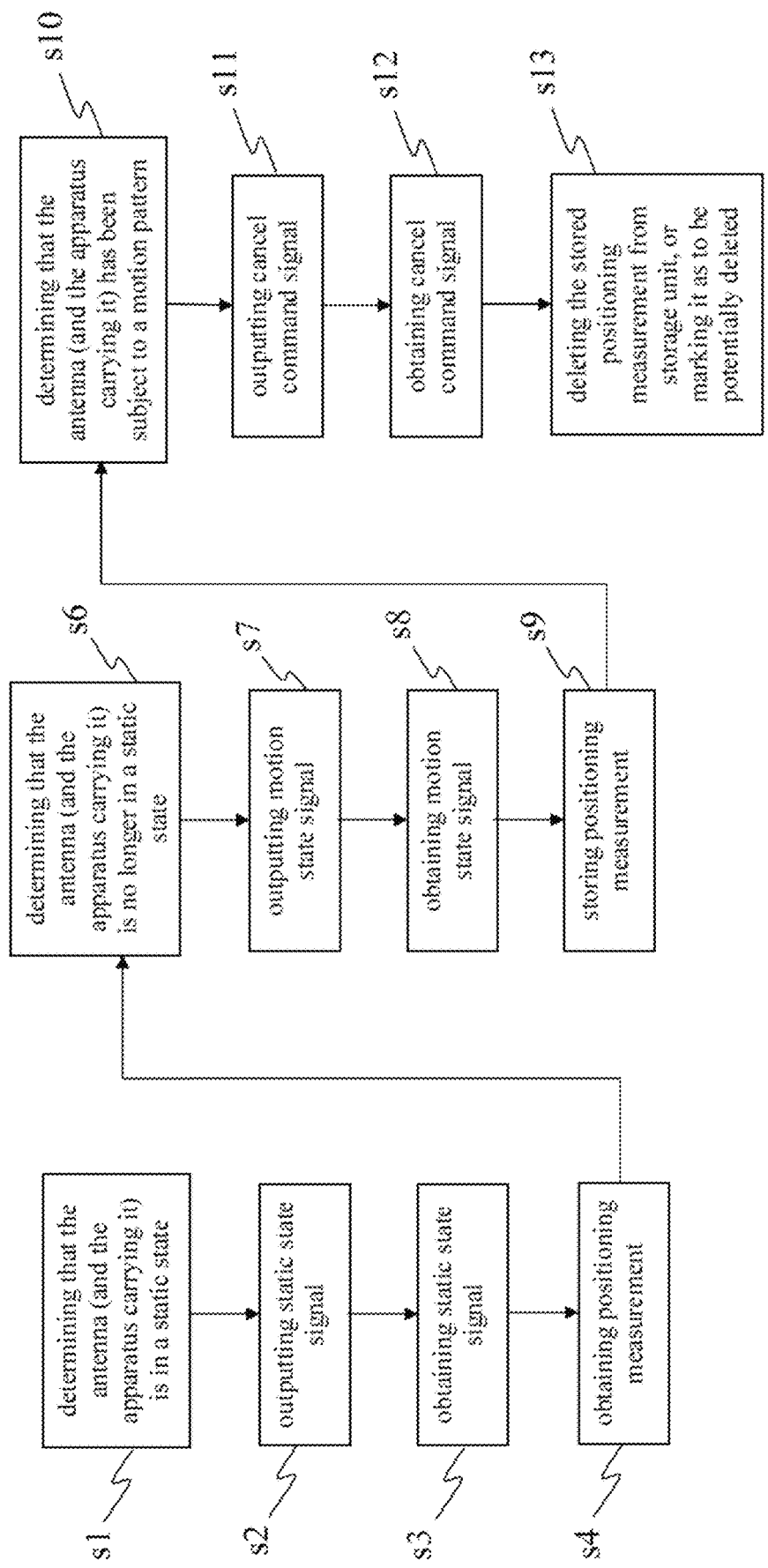

FIGS. 7 and 8 are flowcharts of methods of operation of a survey system 100 in two embodiments of the invention, wherein subjecting the apparatus comprising antenna 10, sensor 30, and optionally control unit 40 to a predefined motion pattern leads to the issuance of a so-called "cancel command signal".

In particular, in the method illustrated by FIG. 7, after the positioning measurement has been stored s5 (as described above with reference to FIG. 5), sensor 30 determines s10 that the antenna-carrying apparatus has been subject to a motion pattern comprising a predefined motion or a predefined set of motions, such as a gesture or set of gestures performed by the operator holding survey pole 20. Examples of gestures with the pole include: a stirring movement to the right or to the left, a swinging forward, backward or crosswise, a vertical movement up or down, or the like.

Sensor 30 then outputs s11 a cancel command signal, which indicates that the antenna-carrying apparatus has been subject to the motion pattern. Control unit 40 obtains s12 said cancel command signal from sensor 30 and, then, control unit 40 performs s13 one of the following operations: deleting the stored positioning measurement from the storage unit, and marking (i.e., flagging) the stored positioning measurement such that it may be later identified and considered for deletion. This embodiment contributes to an automated management of data in the context of registration of survey points, especially in the event that the operator has realized that the previously registered point was incorrect, for example, taken at the wrong location or in the wrong sequence, or the setup was faulty, for example, due to carelessness in the placement of the tip of the survey pole 20.

The method illustrated by FIG. 8 combines the steps described with reference to FIGS. 6 and 7.

In embodiments of any one of the methods described with reference to FIGS. 7 and 8, once the stored positioning measurement has been deleted from the storage unit, or once it has been marked such that it may be later identified and considered for deletion, a feedback, such as for example a visual or audio feedback, may be issued, to inform the operator that the point registration has been cancelled or flagged as potentially problematic.

In relation to the embodiments described above with reference to FIGS. 1 to 8, it has been explained that sensor 30 may output a static state signal indicating that the antenna-carrying apparatus is in a static state, a motion state signal indicating that the antenna-carrying apparatus is no longer static, or a cancel command signal indicating that the antenna-carrying apparatus has been subject to a predefined motion pattern (the so-called "cancel command motion pattern)". In other embodiments of the invention however, instead of (or in addition to) outputting these signals, sensor 30 may produce and output information, such as for example raw accelerometer data, based on which a determination is later made outside sensor 30. In particular, in one embodiment, a determination as to whether the antenna-carrying apparatus is in a static state is made by control unit 40, or any other processing unit, based on information outputted by sensor 30. In one embodiment, a determination as to whether the antenna-carrying apparatus is no longer static is made by control unit 40, or any other processing unit, based on information outputted by sensor 30. In one embodiment, a determination as to whether the antenna-carrying apparatus has been subject to a predefined motion pattern (the so-called "cancel command motion pattern") is made by control unit 40, or any other processing unit, based on information outputted by sensor 30.

Any of the above-described methods and their embodiments may be implemented, at least partially, by means of a computer program or a set of computer programs. The computer program(s) may be loaded on a survey apparatus with an embedded or remotely attached control unit 40, wherein the survey apparatus may for example be a NSS receiver (running on a rover station), with or without a hand-held controller. Therefore, the invention also relates to computer programs, which, when carried out on a survey apparatus, such as for example a NSS receiver (running on a rover station), with or without a hand-held controller, carries out any one of the above-described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD-ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a software or firmware update adapted to be installed on receivers already in the field, i.e. a computer program which is delivered to the field as a computer program product. This applies to each of the above-described methods, systems and apparatuses.

Where the term "control unit" or the like is used herein as units of an apparatus (such as a NSS receiver, or hand-held controller), no restriction is made regarding how distributed the constituent parts of a unit may be. That is, the constituent parts of a unit may be distributed in different software or hardware components or devices for bringing about the intended function. Furthermore, the units may be gathered together for performing their functions by means of a combined, single unit.

The above-mentioned units—such as for example control unit 40—and sub-units may be implemented using hardware, software, a combination of hardware and software, pre-programmed ASICs (application-specific integrated circuit), etc. A unit may include a central processing unit (CPU), a storage unit, input/output (I/O) units, network connection devices, etc.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. Method for operating a survey system comprising an antenna configured to receive at least one positioning signal and a survey pole coupled to the antenna, the method comprising:
   performing, by a sensor coupled to the antenna, at least one of the following operations:
      determining (s1) whether the antenna is in a static state, wherein in the static state being defined by a predetermined threshold tolerance level, wherein the survey pole is also in the static state when the antenna is in the static state, wherein determining that the antenna is in the static state is independent from determining whether the survey pole nears a vertical position; and
      producing a first output signal indicating that the antenna is in static state; and
   performing, by a control unit, at least one of the following operations:
      receiving the first output signal indicating that the antenna is in the static state; and
      upon receiving the first output signal, automatically obtaining (s4) a positioning measurement based on the at least one positioning signal.

2. Method of claim 1, wherein the antenna is determined to be in a static state upon determining that the antenna has been static for a predefined period of time, preferably for the predefined period of time being a value comprised between 1 and 20 seconds.

3. Method of claim 1, further comprising, after automatically obtaining, by the control unit, the positioning measurement, storing the positioning measurement in a storage unit.

4. Method according to claim 1, further comprising, after obtaining, by the control unit, the positioning measurement, and once the antenna is no longer determined to be in a static state, storing the positioning measurement in a storage unit.

5. Method of claim 3, further comprising:
   performing, by a sensor, at least one of the following operations:
      determining that the antenna has been subject to a motion pattern, hereinafter referred to as "cancel command motion pattern", comprising at least one of:
         a predefined motion; and
         a predefined set of motions; and
      producing information based on which a determination that the antenna has been subject to the cancel command motion pattern can be made; and
   if the antenna is determined to have been subject to the cancel command motion pattern, performing, by the control unit, at least one of the following operations:
      deleting the stored positioning measurement from the storage unit, and
      marking the stored positioning measurement such that it may be identified and considered for deletion.

6. Computer program or set of computer programs comprising instructions configured, when executed on a computer, to cause the computer to carry out the method according to claim 1.

7. Computer readable medium or set of computer readable mediums storing a computer program or set of computer programs according to claim 6.

8. A method for operating a survey system comprising an antenna configured to receive at least one positioning signal and a survey pole coupled to the antenna in such a manner that, when the antenna is in a static state, the survey pole is also in the static state, the method comprising:
   determining, by a sensor coupled to the antenna, that the antenna is in the static state, the static state being defined by a predetermined threshold tolerance level, and wherein determining that the antenna is in the static state is independent from determining whether the survey pole nears a vertical position;
   producing, by the sensor, a first output signal, the first output signal indicating that the antenna is in the static state;
   receiving, by a control unit, the first output signal indicating that the antenna is in the static state; and
   upon receiving the first output signal, automatically obtaining, by the control unit, a positioning measurement based on the at least one positioning signal.

9. The method of claim 8, wherein the sensor is at least one of an accelerometer, a gyroscope, and a camera.

10. The method of claim 8, wherein the sensor comprises a camera configured to record images over time, and determining that the antenna is in the static state is based on a degree of change in the images recorded over time.

11. The method of claim 8, further comprising:
    determining a positioning measurement of a point of the survey pole based on at least the positioning measurement, an attitude of the survey pole, and a length of the survey pole.

12. The method of claim 8, wherein the sensor comprises an accelerometer, and determining that the antenna is in the static state is based on a standard deviation computation of accelerometer data.

13. The method of claim 8, further comprising:
    storing the positioning measurement in a data store;
    determining that the antenna has been subject to a predefined motion pattern; and
    editing the positioning measurement in the data store.

14. The method of claim 8, further comprising:
    determining that the antenna is no longer in the static state;
    storing the positioning measurement in a data store;
    determining that the antenna has been subject to a predefined motion pattern; and
    deleting the positioning measurement in the data store.

15. One or more non-transitory computer-readable media storing computer-readable instructions that, upon execution on a computer system, configure the computer system to:

receive, from a motion sensor, motion data corresponding to movement of an antenna coupled to the motion sensor;

receive, from the motion sensor, attitude data corresponding to an attitude of a survey pole, the survey pole being coupled to the antenna in such a manner that, when the antenna is static, the survey pole is also static;

determine, from the motion data, that the antenna is in a static state, the static state being defined by a predetermined threshold tolerance level, and wherein determining that the antenna is in the static state is independent from determining the attitude of the survey pole;

produce a first output signal indicating that the antenna is in the static state; and upon receiving the first output signal, automatically obtain a positioning measurement, the positioning measurement being based on at least one positioning signal received by the antenna.

16. The computer-readable instructions of claim 15, wherein the execution of the computer readable instructions further configures the computer system to:

issue a feedback to a user to inform the user that the positioning measurement has been obtained.

17. The computer-readable instructions of claim 15, wherein the execution of the computer-readable instructions further configures the computer system to:

store the positioning measurement in a data store;

determine that the antenna has been subject to a predefined motion pattern;

edit the positioning measurement in the data store; and issue a feedback to a user to inform the user that the positioning measurement has been edited.

18. The computer-readable instructions of claim 15, wherein the execution of the computer-readable instructions further configures the computer system to:

determine, based on the attitude data, whether to obtain the positioning measurement when the attitude of the survey pole is determined to be beyond a threshold angle.

19. The computer-readable instructions of claim 15, wherein the antenna is determined to be in the static state only after being in the static state for a predetermined period of time.

20. The computer-readable instruction of claim 15, wherein the motion data comprises a signal indicating that the antenna is in the static state.

* * * * *